(12) United States Patent
Wang et al.

(10) Patent No.: US 8,680,900 B2
(45) Date of Patent: Mar. 25, 2014

(54) SELF-INITIALIZING ON-CHIP DATA PROCESSING APPARATUS AND METHOD OF SELF-INITIALIZING AN ON-CHIP DATA PROCESSING APPARATUS

(75) Inventors: Bingda Brandon Wang, Milpitas, CA (US); Kostadin Gitchev, San Jose, CA (US)

(73) Assignee: ARM Limited, Cambridge (GB)

(*) Notice: Subject to any disclaimer, the term of this patent is extended or adjusted under 35 U.S.C. 154(b) by 33 days.

(21) Appl. No.: 13/571,753

(22) Filed: Aug. 10, 2012

(65) Prior Publication Data

US 2014/0043071 A1     Feb. 13, 2014

(51) Int. Cl.
     *H03L 7/00*      (2006.01)
(52) U.S. Cl.
     USPC ........................................................ 327/142
(58) Field of Classification Search
     USPC ........................................................ 327/142
     See application file for complete search history.

(56) References Cited

U.S. PATENT DOCUMENTS

| 4,043,112 A | * | 8/1977 | Tanaka ............................ 368/66 |
| 4,140,930 A | | 2/1979 | Tanaka |
| 7,839,016 B2 | | 11/2010 | Wang et al. |

* cited by examiner

*Primary Examiner* — Daniel Rojas
(74) *Attorney, Agent, or Firm* — Nixon & Vanderhye P.C.

(57) ABSTRACT

An on-chip data processing apparatus has an operating supply voltage selected from a range of supply voltages and has voltage level detection circuitry configured to determine the level of the operating supply voltage. The voltage level detection circuitry comprises adaptive circuitry responsive to a variation in the reference voltage. Phase lock loop circuitry is configured to generate a source clock signal from the operating supply voltage, to receive the voltage level selection signal, to select a target frequency for the source clock signal in dependence on the voltage level selection signal, and to phase lock the source clock signal on the target frequency. Initialization circuitry is configured to initialize the on-chip data processing apparatus for data processing in dependence on the level of said operating supply voltage after the phase lock loop circuitry has phase locked the source clock signal on the target frequency.

19 Claims, 8 Drawing Sheets

SELF-INITIALIZING ON-CHIP DATA PROCESSING APPARATUS AND METHOD OF SELF-INITIALIZING AN ON-CHIP DATA PROCESSING APPARATUS

BACKGROUND OF THE INVENTION

1. Field of the Invention

The present invention relates to a data processing apparatus which is embodied on-chip. More particularly, this invention relates to the initialization of such an on-chip data processing apparatus.

2. Description of the Prior Art

It is common for a data processing apparatus to be embodied on-chip, i.e. fabricated as an integrated circuit on a silicon chip. When such a data processing apparatus is started up, it is known for an initialization procedure to be carried out which is dependent on a reliable and stable clock signal being provided. For example, one way of carrying out the initialization procedure is under the control of a finite state machine (FSM) which leads the data processing apparatus through a well-defined set of states to ensure that the data processing apparatus is correctly configured for its subsequent data processing operations.

An on-chip clock signal can be generated by means of phase lock loop circuitry, which takes a supply voltage and generates a phase locked clock signal, which may either be used directly as the clock signal for the data processing apparatus or may be used to generate a system clock (for example by suitable gating of the phase locked clock signal). Because of the critical nature of the clock signal for reliable initialization, it is known for the initialization procedure for the data processing apparatus to hold the components which are to be initialized in a reset state until the phase lock loop circuitry indicates that the phase locked clock signal has been established. Only thereafter is the initialization procedure carried out (for example under the control of the FSM).

Accordingly, the level of the supply voltage provided to the phase lock loop circuitry is a critical parameter for reliably establishing the phase locked clock signal, in particular because the frequency at which the phase lock loop circuitry is able to generate the clock signal is dependent on the supply voltage level. Phase lock loop circuitry is typically able to accept a modest variation in the supply voltage and to still be able to generate a target frequency for the phase locked clock signal. However if the variation in the supply voltage level is too great, then the phase lock loop circuitry may be unable to establish the phase locked clock signal at its target frequency.

However it may also be the case that in order to function correctly, the data processing apparatus must be able to operate using a range of supply voltages which exceeds the variation which the phase lock loop circuitry can tolerate in order to establish the phase locked clock signal. One such example of this may arise in the context of an on-chip data processing apparatus which is required to communicate with an off-chip destination according to a given data exchange protocol. For example, where the data processing apparatus is a DDR PHY component of a System-on-Chip (SoC), the DDR PHY component may be configured to communicate according to a number of JEDEC DDR protocols (e.g. DDR, DDR2, DDR3 and the various different standards defined for each). Each JEDEC DDR protocol has a defined operating voltage and data transmission frequency and the DDR PHY component must be configured to operate using the corresponding operating voltage and at the corresponding data transmission frequency. Whilst a particular DDR PHY component could be configured to be used only for one particular DDR protocol, it is clearly advantageous if a generic DDR PHY component can be provided which is able to operate in accordance with as many DDR protocols as possible.

However the above mentioned limited tolerance of the phase lock loop circuitry can be a limiting factor on the ability of a system designer to provide such an "all purpose" data processing apparatus, which is required to cope with both a range of operating frequencies and supply voltages. Indeed the interplay between the supply voltage level and the frequency at which the phase lock loop circuitry is able to establish a phase locked clock signal can result in a deadlock situation when trying to initialize such a data processing apparatus, in which it is not possible to establish a phase locked clock signal at a particular frequency due to the supply voltage not being compatible with phase locking at that particular frequency. This leads to the requirement to determine the level of the supply voltage before determining a target frequency at which phase locking the clock signal is possible.

A known method for determining the level of the supply voltage involves the use of bandgap circuitry to provide a very precise reference voltage against which the level of the supply voltage can be compared. However, whilst a reference voltage can be provided very precisely by bandgap circuitry, its operation is very process dependent (thus needing silicon correlations) and it is typically both large (in terms of silicon area) and power hungry.

Accordingly it would be desirable to provide an improved technique for enabling the above-mentioned phase locking of the clock signal and apparatus initialisation.

SUMMARY OF THE INVENTION

Viewed from a first aspect, the present invention provides an on-chip data processing apparatus configured to use an operating supply voltage selected from a range of supply voltages, said on-chip data processing apparatus comprising:

voltage level detection circuitry configured to determine a level of said operating supply voltage within said range of supply voltages by comparison to a reference voltage and to generate a voltage level selection signal in dependence on a result of said comparison, wherein said voltage level detection circuitry comprises adaptive circuitry responsive to a variation in said reference voltage such that said determination of said level of said operating supply voltage is independent of said variation in said reference voltage;

phase lock loop circuitry configured to generate a source clock signal from said operating supply voltage, said phase lock loop circuitry configured to receive said voltage level selection signal, to select a target frequency for said source clock signal in dependence on said voltage level selection signal, and to phase lock said source clock signal on said target frequency; and initialization circuitry configured to initialize said on-chip data processing apparatus for data processing in dependence on said level of said operating supply voltage with respect to said range of supply voltages after said phase lock loop circuitry has phase locked said source clock signal on said target frequency.

The correct initialization of the on-chip data processing apparatus is reliant upon the provision of a phase locked source clock signal from the phase lock loop circuitry and accordingly the initialization circuitry is configured only to perform the initialization of the on-chip data processing apparatus once the phase lock loop circuitry has successfully phase locked the source clock signal on the target frequency (for example after the phase lock loop circuitry issues a "phase lock" signal to the initialization circuitry indicative of this fact).

In order to allow the phase lock loop circuitry to establish the phase locked clock signal at a target frequency, that target frequency is determined by a voltage selection signal which is generated by the voltage level detection circuitry. In other words the target frequency at which the phase lock loop circuitry seeks to establish the phase locked clock signal is selected in dependence on the detected voltage level of the operating supply voltage indicated by the voltage selection signal. The voltage level detection circuitry comprises adaptive circuitry responsive to a variation in said reference voltage such that said determination of said level of said operating supply voltage is independent of said variation in said reference voltage. The variation of the reference voltage (which could for example be the core supply voltage on-chip, typically referred to as VDD) could be problematic for the voltage level detection circuitry if this variation was sufficient to affect the determination of the level of the operating supply voltage, in which case the phase lock loop circuitry could be wrongly informed of the level of the operating supply voltage. However this problem is mitigated by the provision of the adaptive circuitry which responds to the variation in the reference voltage in such a manner that the determination of said level of said operating supply voltage is unaffected. In essence the determination process itself is adapted as the reference voltage changes, so that the level of the operating supply voltage is reliably determined.

Accordingly the data processing apparatus is able to "self-configure" by determining the voltage level of the operating supply voltage and arranging the phase lock loop circuitry to seek to phase lock on an appropriate target frequency which it will be possible for the phase lock loop circuitry to "tune into" at the given operating supply voltage.

Hence the data processing apparatus can be provided by the system designer in a configuration which is able to self-initialize, despite the variation in the operating supply voltage.

The on-chip data processing apparatus could take a number of forms, but in one embodiment said on-chip data processing apparatus comprises input-output circuitry configured to participate in data exchange with an off-chip destination, wherein said operating supply voltage is determined by a protocol used for said data exchange. It is advantageous if the input-output circuitry (usually on the periphery of a chip) is able to communicate according to a number of protocols. This means that a generic on-chip data processing apparatus may be provided by the system designer (whether as a physical device, or as a designed layout for an integrated circuit say in the format of a gds2 file). Where the protocol used for the data exchange specifies the operating supply voltage, if the input-output circuitry is then able to adapt to the specified operating supply voltage (for example both operating using that operating supply voltage and configuring itself to use an internal clock signal known to correspond to that operating supply voltage) then the input-output circuitry can be used in conjunction with a range of data exchange protocols and yet still be able to self-initialize.

The voltage level selection signal may be provided in a variety of formats, but in one embodiment said voltage level detection circuitry is configured to generate said voltage level selection signal as a digital value indicative of a selected sub-range within said range of supply voltages. This facilitates the interpretation of the voltage level selection signal in the phase lock loop circuitry, since the discrete digital value is associated with a predetermined range of the supply voltage and the phase lock loop circuitry can then select a corresponding target frequency.

In one embodiment the digital value is a binary value indicative of whether said level of said operating supply voltage is in a first sub-range of said range of supply voltages or is in a second sub-range of said range of supply voltages. This in turn means that the phase lock loop circuitry can have a relatively simple construction, needing only to switch between two configurations for two corresponding target frequencies.

In one embodiment said adaptive circuitry comprises a self-biasing feedback circuitry. The self-biasing nature of this feedback circuitry (for example provided by a self-biased active load) provides a mechanism for generating a signal which can be used to adjust the voltage determination process, for example by adjusting the impedance of a component which the operating supply voltage loads as part of the voltage determination mechanism, such that that impedance varies in proportion to the variation in the operating supply voltage and the corresponding voltage drop across that component is substantially unaffected.

Further, in one embodiment said voltage level detection circuitry comprises a threshold device configured to generate said voltage level selection signal, wherein an input voltage of said threshold device is dependent on an output of said adaptive circuitry. Accordingly the voltage level selection signal depends on the relative level of the input voltage to the threshold device, whilst the dependence of that input voltage on an output of the adaptive circuitry means that the voltage level selection signal can be reliably provided.

The threshold device could take a number of forms, but in one embodiment said threshold device is an inverter. In another embodiment said threshold device is a comparator.

In one embodiment said voltage level detection circuitry is configured to generate at least one scaled down version of said operating supply voltage for comparison to said reference voltage. This enables a greater range of operating supply voltages to have their levels determined by the voltage level determination circuitry for a given reference voltage.

The scaling down of the operating supply voltage could be provided in a variety of ways, but in some embodiments said at least one scaled version of said operating supply voltage is generated from a selected node of a chain of resistors.

In some embodiments said initialization circuitry is configured to adapt a configuration of said input-output circuitry in dependence on said voltage level selection signal. Accordingly, not only can the voltage level selection signal be provided to the phase lock loop circuitry to enable it to correctly select the target frequency for phase locking, but this voltage level selection signal can also be used to configure the input-output circuitry appropriately for the detected level of the operating supply voltage.

It will be appreciated that various configurations of the input-output circuitry could be adapted in this manner, but in one embodiment the configuration determines a gain characteristic of said input-output circuitry, wherein said gain characteristic of said input-output circuitry is dependent on said operating supply voltage. In another embodiment the configuration determines a power consumption characteristic of said input-output circuitry. In yet another embodiment the configuration determines an operational frequency characteristic of said input-output circuitry.

In one embodiment the on-chip data processing apparatus is a DDR PHY component. In one such embodiment the data exchange takes place in accordance with a JEDEC-defined DDR standard, wherein said JEDEC-defined DDR standard defines said level of said operating supply voltage.

In one embodiment said off-chip destination is a DRAM memory device.

Viewed from a second aspect, the present invention provides an on-chip data processing apparatus configured to use an operating supply voltage selected from a range of supply voltages, said on-chip data processing apparatus comprising:

voltage level detection means for determining a level of said operating supply voltage within said range of supply voltages by comparison to a reference voltage and to generate a voltage level selection signal in dependence on a result of said comparison;

phase lock loop means for generating a source clock signal from said operating supply voltage, said phase lock loop circuitry configured to receive said voltage level selection signal, to select a target frequency for said source clock signal in dependence on said voltage level selection signal, and to phase lock said source clock signal on said target frequency; and initialization means for initializing said on-chip data processing apparatus for data processing in dependence on said level of said operating supply voltage with respect to said range of supply voltages after said phase lock loop means has phase locked said source clock signal on said target frequency.

Viewed from a third aspect of the present invention provides a method of initializing an on-chip data processing apparatus configured to use an operating supply voltage selected from a range of supply voltages, said method comprising the steps of:

determining a level of said operating supply voltage within said range of supply voltages by comparison to a reference voltage and to generate a voltage level selection signal in dependence on a result of said comparison;

generating a source clock signal from said operating supply voltage by receiving said voltage level selection signal in phase lock loop circuitry, selecting a target frequency for said source clock signal in dependence on said voltage level selection signal, and phase locking said source clock signal on said target frequency; and initializing said on-chip data processing apparatus for data processing in dependence on said level of said operating supply voltage with respect to said range of supply voltages after said phase locking of said source clock signal on said target frequency has been established.

BRIEF DESCRIPTION OF THE DRAWINGS

The present invention will be described further, by way of example only, with reference to embodiments thereof as illustrated in the accompanying drawings, in which.

DESCRIPTION OF THE PREFERRED EMBODIMENTS

Figure 1:
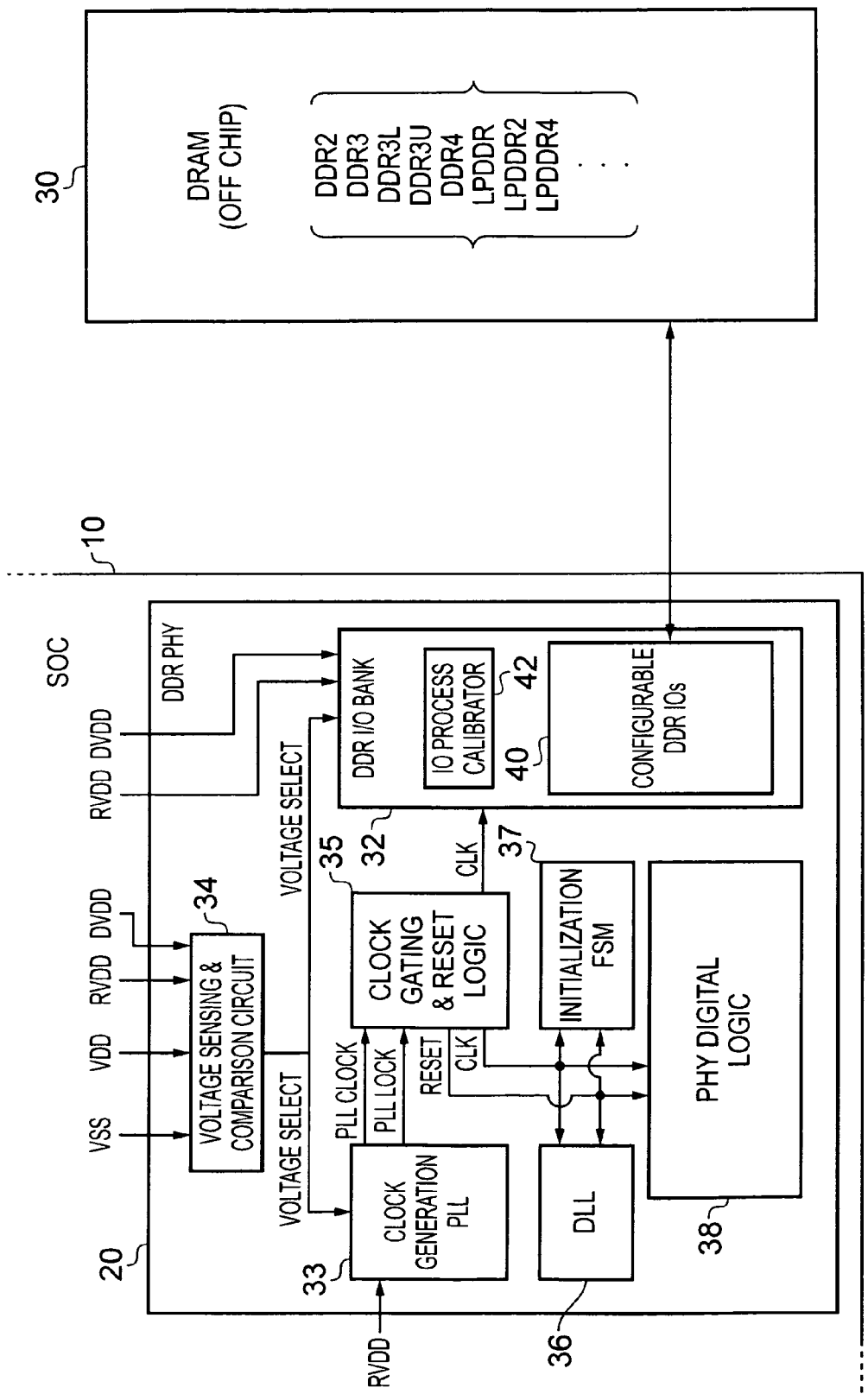
FIG. 1 schematically illustrates an on-chip data processing apparatus having a DDR PHY configured to exchange data with an off-chip DRAM.

FIG. 1 schematically illustrates a system-on-chip (SoC) 10 comprising a DDR PHY 20. The DDR PHY 20 is provided so that components of the SoC 10 can communicate with the off-chip DRAM 30. This communication with the DRAM 30 may take place according to a range of DDR standards, such as those defined by JEDEC. Depending on the particular choice of DDR standard to be used for communication between the DDR PHY 20 and the DRAM 30, this will require the DDR PHY 20 to use various operational voltage supplies and to be configured to operate at an appropriate clock frequency. In order that only a single configuration of the DDR PHY 20 need be provided by the system designer, the DDR PHY 20 is configured to auto-sense the power supply voltage level at power up, in addition to using a digitally controlled initialisation sequence of the DDR PHY to tune the performance and/or power consumption as appropriate to the selected DDR standard. This advantageously means that the SoC system designer is able to provide the SoC 10, and in particular its DDR PHY 20, without having to configure it to interact with the DRAM 30 according to a particular DDR protocol.

The DDR PHY 20 is supplied by RVDD, the analogue voltage supply that powers the DDR I/O bank 32 and the clock generation phase lock loop (PLL) circuitry 33, as well as by DVDD, the digital voltage supply used for the communication with the off-chip DRAM 30. As well as being supplied to the DDR I/O bank 32, these supply voltages are also provided to voltage sensing and comparison circuitry 34. Further components of the DDR PHY 20 are the clock gating and reset logic 35, the delay lock loops (DLL) 36, the initialisation finite state machine (FSM) 37 and the PHY digital logic 38.

When powering up the DDR PHY 20 ideally the clock generation PLL logic 33 would immediately generate a suitable PLL clock signal on the basis of which the clock gating and reset circuitry 35 would generate the system clock signal CLK to be provided to the various components of the DDR PHY 20. However, a challenge faced by the DDR PHY 20 is that the frequency of the PLL clock which it is able to generate is dependent on the level of the analogue supply voltage RVDD which it receives. Further, in order to provide a "multipurpose" DDR PHY component, the range of RVDD supply voltages which it may encounter can put the DDR PHY 20 in a position where unless the voltage level of the RVDD supply voltage is known, it is not possible to determine the appropriate frequency at which the clock generation PLL 33 should seek to phase lock the PLL clock. The DDR PHY 20 addresses this issue by providing the voltage sensing and comparison circuit 34 which in addition to the analogue supply voltage RVDD also receives the core digital supply voltages VSS and VDD. The voltage sensing and comparison circuit 34 is a relatively small component, in particular in comparison to band gap circuitry which might otherwise have been used to provide a reference voltage against which RVDD might be compared. Accordingly, not only is the silicon area which would have been occupied by the band gap circuitry saved in the embodiment illustrated in FIG. 1, but also it is less power hungry than the traditional band gap circuitry.

Further detail of the voltage sensing and comparison circuit is described below with reference to FIGS. 4-7.

The voltage sensing comparison circuit 34 generates a voltage selection signal (voltage select) which is passed to the clock generation PLL 33 and to the DDR I/O bank 32. This voltage select signal enables the clock generation PLL 33 to determine the appropriate configuration to seek to phase lock the PLL clock. In this embodiment the voltage select signal is a binary signal which indicates whether RVDD is nominally at 1.8V or 2.5V. More generally, the voltage sensing and comparison circuit 34 could be configured to provide a (typically digital) voltage select signal providing an indication of which of more than two possible nominal values for RVDD is currently present. The voltage sensing comparison circuit 34 uses the core supply voltage VDD as its reference voltage supply against which the level of RVDD is determined. It is recognised that the core voltage supply VDD only has a relatively stable value, typically varying by +/−10%. For example, a 1.0V nominal VDD may be expected to range between 0.9V and 1.1V. However, the voltage sensing and comparison circuit 34 is configured to be able to automatically adapt to these variations in the reference voltage, as will be described in more detail with reference to FIGS. 4-6.

Accordingly, once the clock generation PLL 33 has appropriately configured itself based on the voltage select signal (for example setting the charge pump and VCO stage gain appropriately) and has phase locked the PLL clock, it indicates this fact via the PLL lock signal which is passed to the clock gating and reset logic 35. Typically the targeted configuration which is possible on the basis of the voltage select signal enables the clock generation PLL 33 to achieve faster phase locking with less jitter.

The clock gating and reset logic 35 is configured to issue a reset signal to the DLL 36, initialisation FSM 37 and PHY digital logic 38 until the PLL logic signal is received. Once the PLL lock signal is received, the clock gating and reset logic 35 releases the reset signal, allowing the initialisation FSM 37 to take the components of the DDR PHY 20 through a well defined start-up sequence to ensure correct operation of the DDR PHY. The clock signal CLK is also then supplied to the DDR I/O bank 32 once the PLL lock signal is generated.

In addition to being used to configure the clock generation PLL 33, the voltage select signal is also used to configure the DDR I/O bank 32. In particular the configurable DDR I/Os 40 and the I/O process calibrator 42 are configured on this basis for example to optimize the gain characteristic (bias level) of the I/Os and to ensure that the power consumption and operational frequency of the I/Os are best configured with respect to the selected DDR protocol for communication with the off-chip DRAM 30.

Figure 2:
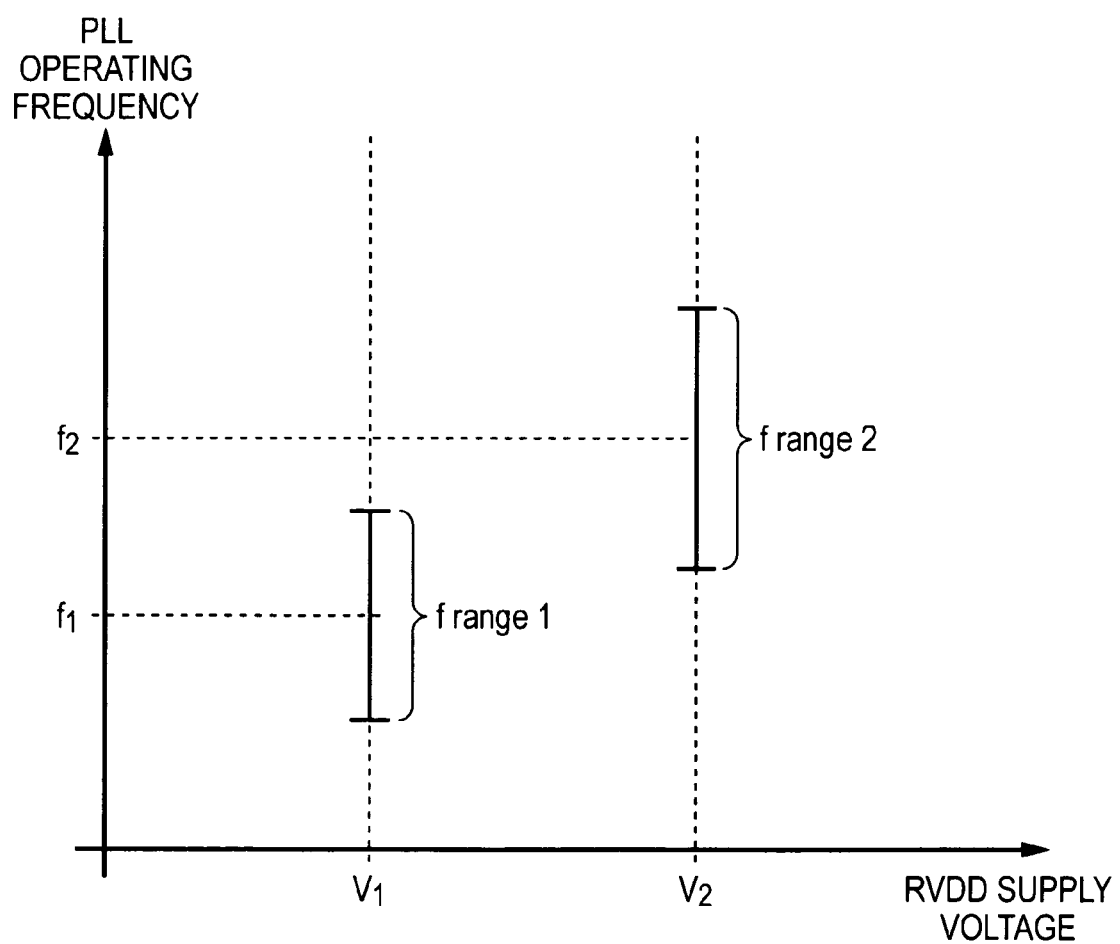
FIG. 2 illustrates two frequency ranges within which phase locking is possible for two different operating supply voltages.

FIG. 2 illustrates the dependency of phase lock loop operating frequency in dependence on the RVDD supply voltage. This illustrates the fact that for a given RVDD supply voltage, the clock generation PLL 33 is able to generate the PLL clock within a limited range of frequency centred around an ideal target frequency corresponding to that RVDD supply voltage. Hence, in order to configure the clock generation PLL 33 to reliably generate the PLL clock, it is necessary for the clock generation PLL 33 to be configured in dependence on the RVDD supply voltage level. In this way, and in the example embodiment illustrated in FIG. 1 wherein voltage sensing and comparison circuit 34 determines whether the RVDD supply voltage is at a first level or a second level (indicating this fact via a binary signal), when the RVDD supply voltage is identified as being $V_1$ then the clock generation PLL 33 can set the target frequency as $f_1$, whilst when the voltage sensing and comparison circuit 34 indicates that the RVDD supply voltage is $V_2$, the clock generation PLL 33 can set the target frequency as $f_2$.

Figure 3:
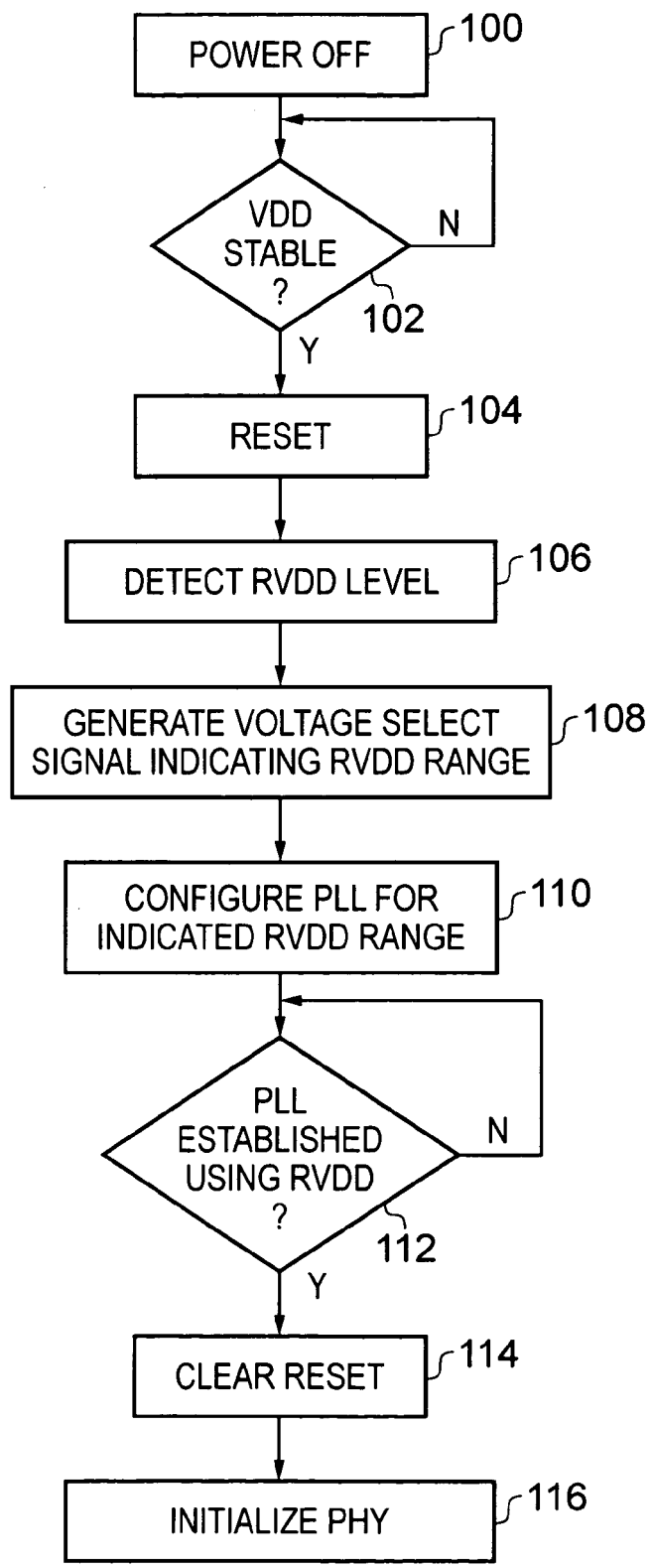
FIG. 3 schematically illustrates a series of steps by which an on-chip data processing apparatus may self-initialise.

FIG. 3 is a flow diagram schematically illustrating the operation of the present techniques in one example embodiment. At step 100, the data processing apparatus is in a power off state. Then at step 102, the first stage of powering up the data processing apparatus comprises establishing a stable VDD core supply voltage for the SoC. Once this is established, the first step of the initialisation procedure for the DDR PHY 20 is the assertion of the RESET signal at step 104. This holds the components of the DDR PHY 20 in a known state until further initialisation is possible. In order for that initialisation to be possible, the next step 106 comprises the detection of the RVDD supply voltage level being provided to the DDR PHY 20 from the SoC. This takes place within the voltage sensing and comparison circuit 34 shown in FIG. 1. Then, at step 108, the voltage sensing and comparison circuit 34 generates a voltage select signal indicating the RVDD range which is present. In the example embodiment of FIG. 1, this comprises the voltage sensing and comparison circuit 34 generating a binary signal, indicating whether RVDD is determined to be nominally at 1.8V or nominally at 2.5V. Then, at step 110, the clock generation PLL 33 is configured on the basis of the voltage select signal such that the PLL clock may be appropriately phase locked on the corresponding target frequency (see FIG. 2). The clock generation PLL 33 then seeks to establish the phase locked PLL clock (step 112) and once this is done, the flow proceeds to step 114 where the reset signal is cleared. Specifically, in the example embodiment of FIG. 1, this takes place by means of the clock generation PLL 33 issuing the PLL lock signal to the clock gating and reset logic 35 once the PLL clock has been phased locked. On receipt of the PLL lock signal the clock gating and reset logic 35 clears the reset signal. Once the reset signal has been cleared, then at step 116 the initialisation of the DDR PHY 20 may be carried out, this taking place under control of the initialisation FSM 37 and the PHY digital logic 38.

Figure 4:
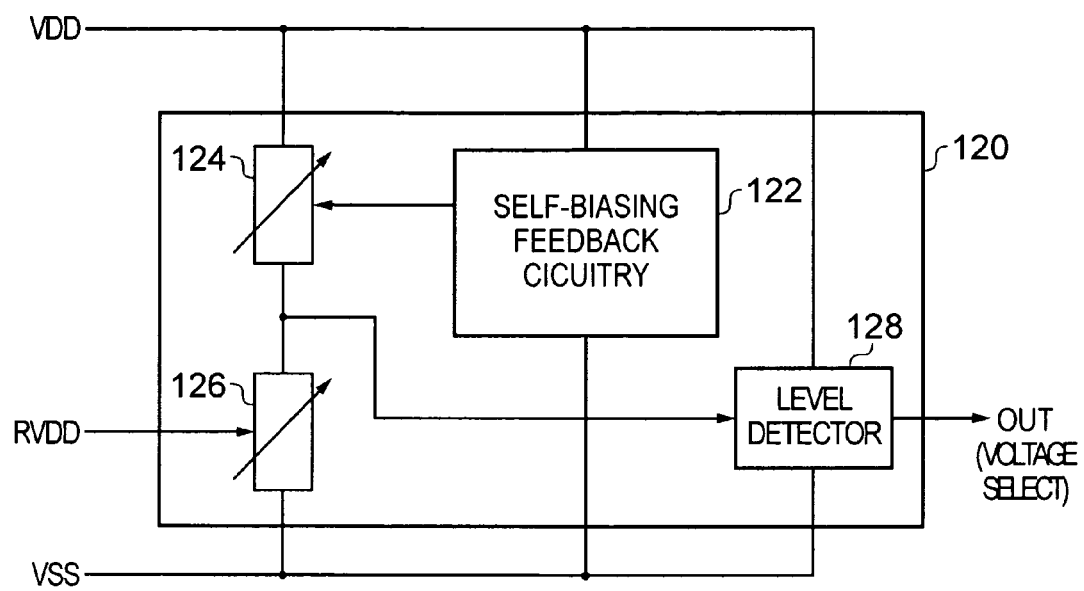
FIG. 4 schematically illustrates adaptive circuitry within the voltage level detection circuitry.

FIG. 4 schematically illustrates more detail of one possible configuration of the voltage sensing and comparison circuit 34 shown in FIG. 1. In this example embodiment the voltage sensing and comparison circuit 120 is provided to determine the voltage level of the RVDD signal on the basis of the core supply voltages VSS and VDD (i.e. without reference to DVDD signal shown in FIG. 1). In particular, the voltage level detection circuitry 120 shown in FIG. 4 has adaptive circuitry in the form of the self-biasing feedback circuitry 122, which enables the voltage level detection circuitry 120 to determine the level of RVDD with reference to the core supply voltage VDD, whilst being substantially insensitive to variations in the level of VDD. Specific examples of how this self-biasing feedback circuitry 122 may be configured are given with reference to the following Figures, but most generally, the action of this self-biasing feedback circuitry 122 is to adjust the variable resistance 124, to account for the above mentioned variations in VDD. In turn, this means that the effect of the level of RVDD on the variable resistance 126 (which may also be adjusted for calibration) determines the voltage level provided to level detector 128, which provides the output signal (voltage select).

Figure 5:
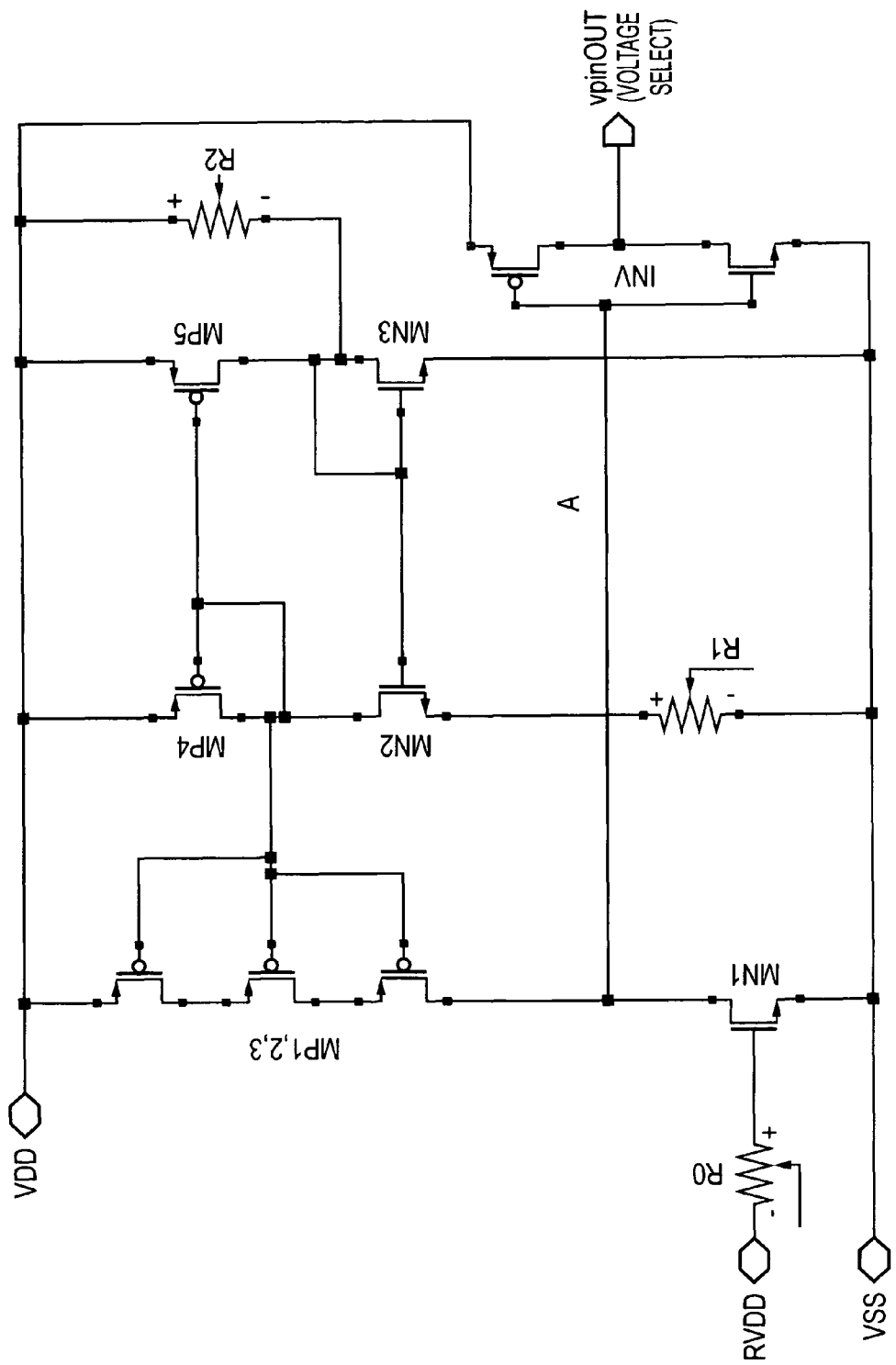
FIG. 5 is a transistor level diagram of adaptive circuitry such as that illustrated in FIG. 4.

FIG. 5 illustrates an example transistor level implementation of the voltage level detection circuitry 120. In this example embodiment the self-biasing feedback circuitry 122 is embodied by gates MN2, MP4, MN3 and MP5 together with resistance R1. In combination, these provide a self-biased active load which acts to adjust the voltage at the gate inputs of the gates MP1, MP2 and MP3. Accordingly, the voltage at node A depends on the voltage level of the RVDD supply voltage (calibrated via resistance R0) at the input to gate MN1. R0 isolates the NMOS gate MN1 from the supply pin (RVDD) for better ESD protection. Note that the pull up string of PMOS gates MP1, MP2 and MP3 are provided as long channel devices in series to reduce the operation power to a few µA. The above mentioned self-biasing ensures that the moderate variations in VDD (for example as mentioned above being of the order of 10%) means that the threshold level against which the voltage at node A is compared (by means of the inverter INV) is substantially constant with variation in the level of VDD. Resistance R2 is a high value (large poly) resistance that injects more current for the self-biasing scheme to stabilise during power up. Hence, the output signal OUT is a digitalised logic signal which reflects the voltage values of RVDD and core VDD respectively.

Figure 6:
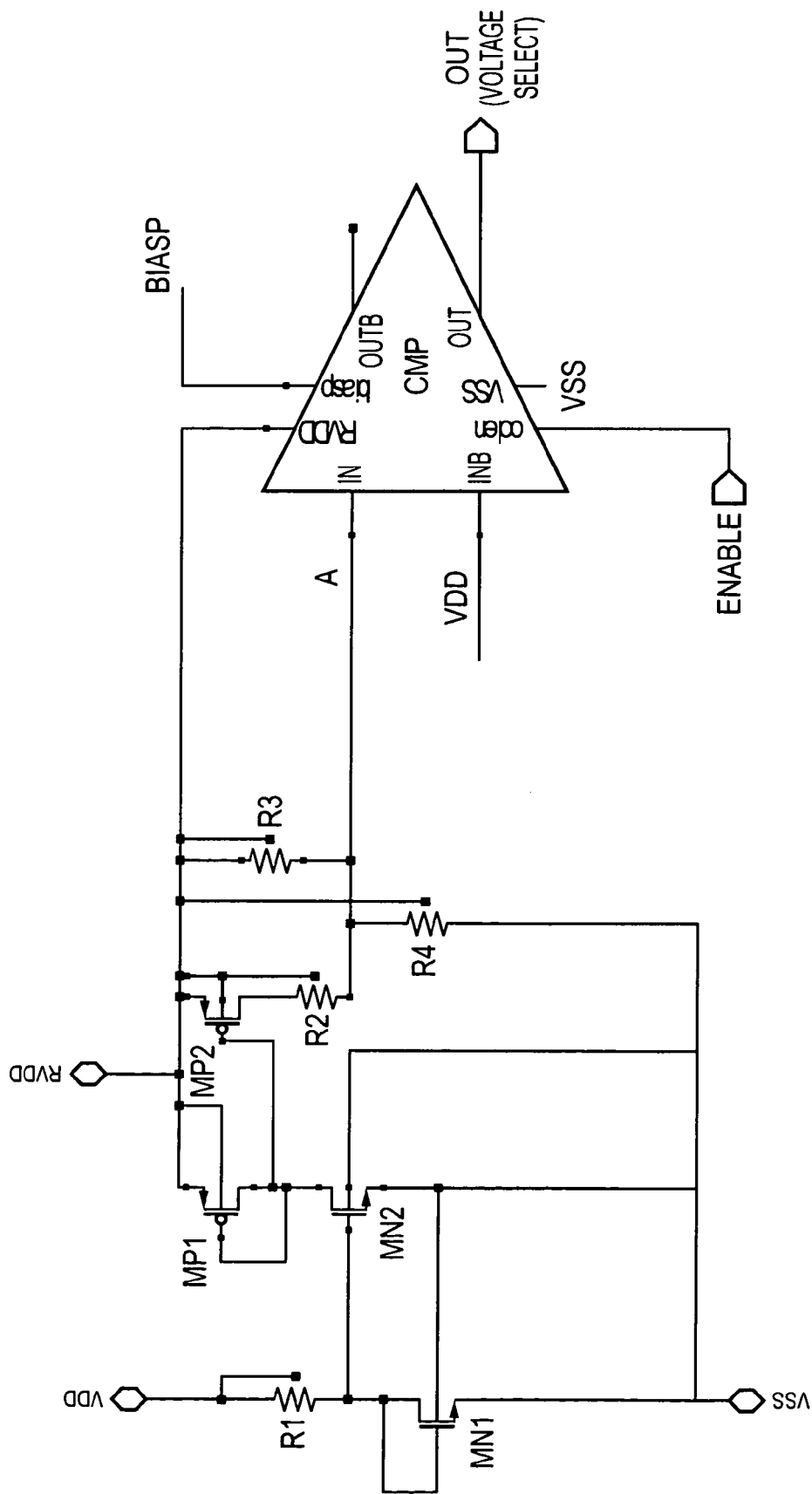
FIG. 6 is a transistor level diagram of another embodiment of the adaptive circuitry shown in FIG. 4.

FIG. 6 schematically illustrates another transistor level implementation of the voltage level detection circuitry 120. Generally it consists of a low power comparator (CMP) such as a folded cascade operational amplifier (OPAM) and resistor dividing circuitry. Resistors R2, R3 and R4 form the voltage divider that generates the voltage level at node A which the comparator CMP compares to the core supply voltage VDD. Resistor R1, and gates MN1, MP1 and MN2 form the network that generates the bias voltage that reversely tracks the VDD level. Therefore, through current mirroring, gate MP2 will adjust the total impedance of the upper divider enabling the circuitry to accommodate the above discussed voltage range of the VDD reference voltage. The comparator CMP will nevertheless have a residual bias current (for example in the range 20-50 µA) which is counteracted by the provision of the ENABLE signal, by means of which the comparator CNP can be switched off when not required.

Figure 7:
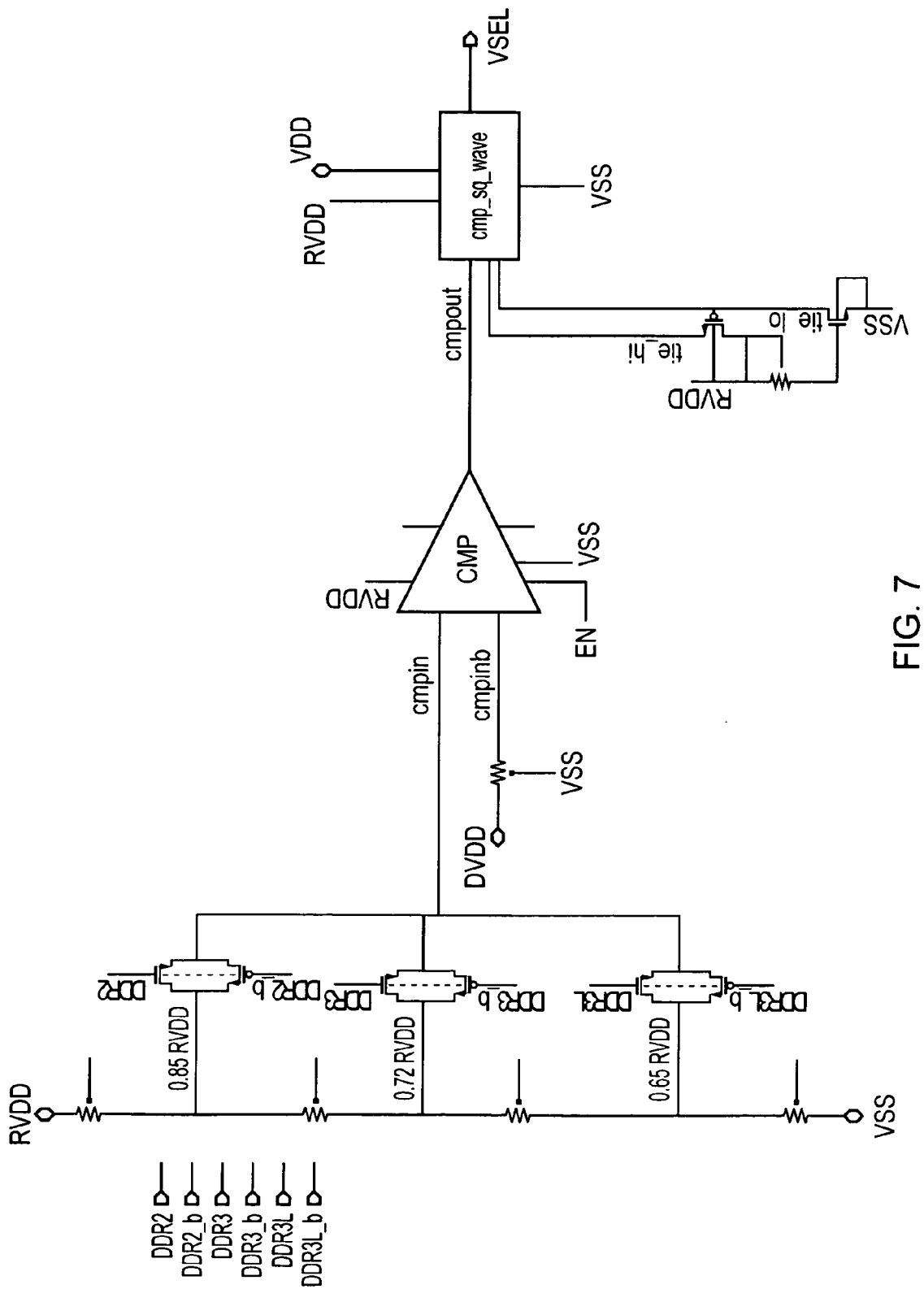
FIG. 7 schematically illustrates another embodiment of the adaptive circuitry shown in FIG. 4.

FIG. 7 schematically illustrates another example embodiment which may be of particular use when RVDD and DVDD have different voltage levels. In this example of the voltage level detection circuitry (voltage sensing and comparison circuit 34 in FIG. 1) a chain of resistors between RVDD and VSS is used to provide a number of nodes from which a scaled down version of RVDD may be selected. In this example implementation the scaled down versions of RVDD correspond to 0.85 RVDD, 0.72 RVDD and 0.65 RVDD. Selection signals DDR2, DDR3 and DDR3L are then employed to select one of these scaled down versions of RVDD (in dependence on the corresponding DDR protocol to be used) for passing to the CMPIN input of the comparator CMP. Comparator CMP is a low power high gain comparator which compares this selected scaled down version of RVDD with the DVDD voltage level. Accordingly, although the DVDD voltage level can vary between different DDR modes, by using the selection logic to choose between the scaled down versions of RVDD, DVDD can be used as the voltage reference for sensing the RVDD voltage level. The wave shaper CMP_SQ_WAVE converts the analogue CMPOUT signal to a VDD domain logic signal VSEL. VSEL can then be used for the above discussed DDR PHY component initialisation procedure. The above described voltage sensing circuitry embodiments shown in FIGS. 5, 6 and 7 are small enough to be embedded in the DDR I/O ring, where all voltage supplies are present and can be easily implemented in the layout using existing horizontal power bus metals.

Figure 8:
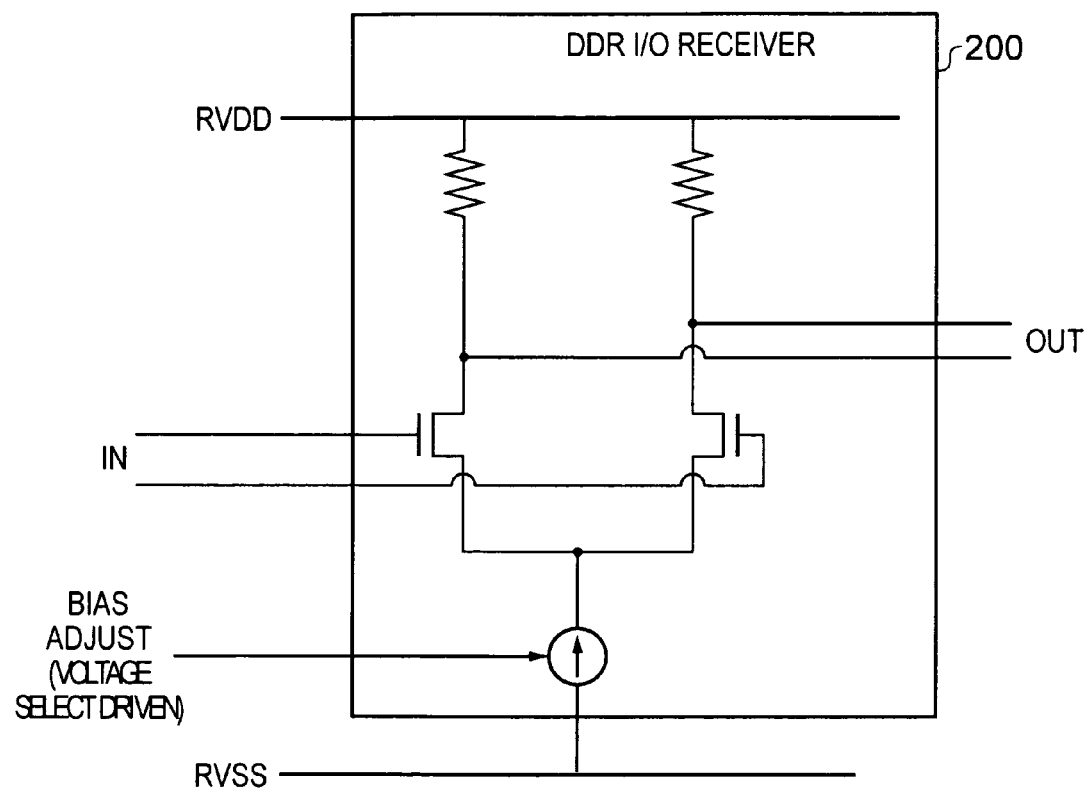
FIG. 8 schematically illustrates the adaptation of a gain characteristic of input-output circuitry.

FIG. 8 schematically illustrates one example of how the voltage select signal generated by the voltage level detection circuitry can be used to adapt the configuration of the configurable DDR I/Os 40 (see FIG. 1). Here, the gain characteristic of a DDR I/O receiver 200 is adjusted by the bias adjust signal shown, which in turn is controlled by the voltage select signal. This is advantageous because when the DDR PHY 20 initialises, the RVDD level is known (by virtue of the voltage select signal). Accordingly, the DDR I/O receiver 200 may choose to use a lower bias current in its input stage OPAM, if it is known that the RVDD level is high (e.g. at the 2.5V supply level) and therefore the receiver circuit will have plenty of leg room for the required gain. Hence, by means of a lower biased current used in the DDR I/O receiver, the power consumption of the DDR I/O bank 32 can be reduced. More generally the voltage select signal enables power optimisation of the DDR PHY as a whole to be carried out. Equally, the generation of the clock signal by means of clock gating and reset logic 35 (FIG. 1) is also a performance characteristic which can be seen to be dependent on (and therefore optimised with respect to) the voltage level selection signal. For example, in an on-chip data processing apparatus having a DDR PHY which is configured to operate either in accordance with DDR2, DDR3 or DD3L, the appropriate speed requirement for these protocols can be determined from the operational supply voltage RVDD (e.g. DDR2 @ 1.8V, DDR3 @ 1.5V, and DDR3L @ 1.35V). These different DDR specifications each have different clock speed requirements (i.e. frequency ranges which are permitted for operation) and accordingly the optimisation of the operating frequency of the relevant system components (e.g. receiver, transmitter, PLL and DLL) can be performed on the basis of the voltage select signal.

Although particular embodiments of the invention have been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. An on-chip data processing apparatus configured to use an operating supply voltage selected from a range of supply voltages, said on-chip data processing apparatus comprising:
    voltage level detection circuitry configured to determine a level of said operating supply voltage within said range of supply voltages by comparison to a reference voltage and to generate a voltage level selection signal in dependence on a result of said comparison, wherein said voltage level detection circuitry comprises adaptive circuitry responsive to a variation in said reference voltage such that said determination of said level of said operating supply voltage is independent of said variation in said reference voltage;
    phase lock loop circuitry configured to generate a source clock signal from said operating supply voltage, said phase lock loop circuitry configured to receive said voltage level selection signal, to select a target frequency for said source clock signal in dependence on said voltage level selection signal, and to phase lock said source clock signal on said target frequency; and
    initialization circuitry configured to initialize said on-chip data processing apparatus for data processing in dependence on said level of said operating supply voltage with respect to said range of supply voltages after said phase lock loop circuitry has phase locked said source clock signal on said target frequency.

2. The on-chip data processing apparatus as claimed in claim 1, wherein said on-chip data processing apparatus comprises input-output circuitry configured to participate in data exchange with an off-chip destination, wherein said operating supply voltage is determined by a protocol used for said data exchange.

3. The on-chip data processing apparatus as claimed in claim 1, wherein said voltage level detection circuitry is configured to generate said voltage level selection signal as a digital value indicative of a selected sub-range within said range of supply voltages.

4. The on-chip data processing apparatus as claimed in claim 3, wherein said digital value is a binary value indicative of whether said level of said operating supply voltage is in a first sub-range of said range of supply voltages or is in a second sub-range of said range of supply voltages.

5. The on-chip data processing apparatus as claimed in claim 1, wherein said adaptive circuitry comprises a self-biasing feedback circuitry.

6. The on-chip data processing apparatus as claimed in claim 1, wherein said voltage level detection circuitry comprises a threshold device configured to generate said voltage level selection signal, wherein an input voltage of said threshold device is dependent on an output of said adaptive circuitry.

7. The on-chip data processing apparatus as claimed in claim 6, wherein said threshold device is an inverter.

8. The on-chip data processing apparatus as claimed in claim 6, wherein said threshold device is a comparator.

9. The on-chip data processing apparatus as claimed in claim 1, wherein said voltage level detection circuitry is configured to generate at least one scaled down version of said operating supply voltage for comparison to said reference voltage.

10. The on-chip data processing apparatus as claimed in claim 9, wherein said at least one scaled version of said operating supply voltage is generated from a selected node of a chain of resistors.

11. The on-chip data processing apparatus as claimed in claim 2, wherein said initialization circuitry is configured to adapt a configuration of said input-output circuitry in dependence on said voltage level selection signal.

12. The on-chip data processing apparatus as claimed in claim 11, wherein said configuration determines a gain characteristic of said input-output circuitry, wherein said gain characteristic of said input-output circuitry is dependent on said operating supply voltage.

13. The on-chip data processing apparatus as claimed in claim 11, wherein said configuration determines a power consumption characteristic of said input-output circuitry.

14. The on-chip data processing apparatus as claimed in claim 11, wherein said configuration determines an operational frequency characteristic of said input-output circuitry.

15. The on-chip data processing apparatus as claimed in claim 2, wherein said on-chip data processing apparatus is a DDR PHY component.

16. The on-chip data processing apparatus as claimed in claim 15, wherein said data exchange takes place in accordance with a JEDEC-defined DDR standard, wherein said JEDEC-defined DDR standard defines said level of said operating supply voltage.

17. The on-chip data processing apparatus as claimed in claim 2, wherein said off-chip destination is a DRAM memory device.

18. An on-chip data processing apparatus configured to use an operating supply voltage selected from a range of supply voltages, said on-chip data processing apparatus comprising:
  voltage level detection means for determining a level of said operating supply voltage within said range of supply voltages by comparison to a reference voltage and to generate a voltage level selection signal in dependence on a result of said comparison, wherein said voltage level detection means comprises adaptive means for responding to a variation in said reference voltage such that said determination of said level of said operating supply voltage is independent of said variation in said reference voltage;
  phase lock loop means for generating a source clock signal from said operating supply voltage, said phase lock loop circuitry configured to receive said voltage level selection signal, to select a target frequency for said source clock signal in dependence on said voltage level selection signal, and to phase lock said source clock signal on said target frequency; and
  initialization means for initializing said on-chip data processing apparatus for data processing in dependence on said level of said operating supply voltage with respect to said range of supply voltages after said phase lock loop means has phase locked said source clock signal on said target frequency.

19. A method of initializing an on-chip data processing apparatus configured to use an operating supply voltage selected from a range of supply voltages, said method comprising the steps of:
  determining a level of said operating supply voltage within said range of supply voltages by comparison to a reference voltage and to generate a voltage level selection signal in dependence on a result of said comparison, wherein said determining comprises using adaptive circuitry responsive to a variation in said reference voltage such that said determining is independent of said variation in said reference voltage;
  generating a source clock signal from said operating supply voltage by receiving said voltage level selection signal in phase lock loop circuitry, selecting a target frequency for said source clock signal in dependence on said voltage level selection signal, and phase locking said source clock signal on said target frequency; and
  initializing said on-chip data processing apparatus for data processing in dependence on said level of said operating supply voltage with respect to said range of supply voltages after said phase locking of said source clock signal on said target frequency has been established.

* * * * *